US009538420B2

(12) United States Patent
Wang et al.

(10) Patent No.: US 9,538,420 B2
(45) Date of Patent: Jan. 3, 2017

(54) EFFICIENT MEDIUM ACCESS CONTROL (MAC) HEADER

(71) Applicant: INTERDIGITAL PATENT HOLDINGS, INC., Wilmington, DE (US)

(72) Inventors: Xiaofei Wang, Cedar Grove, NJ (US); Guodong Zhang, Syosset, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 214 days.

(21) Appl. No.: 13/875,721

(22) Filed: May 2, 2013

(65) Prior Publication Data

US 2013/0294431 A1 Nov. 7, 2013

Related U.S. Application Data

(60) Provisional application No. 61/642,741, filed on May 4, 2012, provisional application No. 61/668,598, filed on Jul. 6, 2012, provisional application No. 61/724,099, filed on Nov. 8, 2012.

(51) Int. Cl.
*H04W 28/06* (2009.01)
*H04W 8/26* (2009.01)
*H04L 12/741* (2013.01)
*H04L 29/06* (2006.01)

(52) U.S. Cl.
CPC .............. *H04W 28/06* (2013.01); *H04L 45/74* (2013.01); *H04L 69/22* (2013.01); *H04W 8/26* (2013.01)

(58) Field of Classification Search
None
See application file for complete search history.

(56) References Cited

U.S. PATENT DOCUMENTS

| 8,477,805 | B2 | 7/2013 | Sekiya et al. |
| 8,867,562 | B2* | 10/2014 | Lee ........................ H04W 74/08 370/252 |
| 9,271,319 | B2* | 2/2016 | Falk ................... H04L 29/12264 |
| 2005/0165950 | A1* | 7/2005 | Takagi .................. H04L 12/413 709/236 |

(Continued)

FOREIGN PATENT DOCUMENTS

WO 2012/159082 11/2012

OTHER PUBLICATIONS

IEEE 802.11, "IEEE Standard for Information technology—Telecommunications and information exchange between systems—Local and metropolitan area networks~Specific requirements Part 11: Wireless LAN Medium Access Control (MAC)and Physical Layer (PHY) Specifications", pp. 1-1184, Jun. 12, 2007.*

(Continued)

*Primary Examiner* — Mounir Moutaouakil
(74) *Attorney, Agent, or Firm* — Volpe and Koenig, P.C.

(57) ABSTRACT

A wireless transmit/receive unit (WTRU) configured to operate in an IEEE 802.11 network may receive a MAC header with two or three address fields and a MAC frame version indicator. The MAC header may have at least one bit that indicates a presence of a third address field in the MAC header. The WTRU may determine a time interval for MAC frame transmissions by multiplying a duration value in a first message field by a multiplier value in a second message field.

20 Claims, 7 Drawing Sheets

(56) References Cited

U.S. PATENT DOCUMENTS

| | | | | |
|---|---|---|---|---|
| 2005/0238016 | A1* | 10/2005 | Nishibayashi | H04L 1/1614 370/389 |
| 2008/0240143 | A1* | 10/2008 | Koga | H04B 3/542 370/445 |
| 2008/0311865 | A1* | 12/2008 | Worfolk | H04W 52/225 455/115.1 |
| 2010/0165959 | A1* | 7/2010 | Park | H04W 72/1215 370/338 |
| 2012/0207074 | A1* | 8/2012 | Kneckt | H04W 74/0816 370/312 |
| 2012/0275378 | A1* | 11/2012 | Lee | H04W 74/08 370/328 |
| 2013/0128809 | A1* | 5/2013 | Wentink | H04L 29/0604 370/328 |
| 2013/0155929 | A1* | 6/2013 | Aboul-Magd et al. | 370/311 |
| 2013/0301569 | A1* | 11/2013 | Wang | H04L 5/0055 370/329 |
| 2014/0198780 | A1* | 7/2014 | Qi et al. | 370/338 |
| 2014/0286328 | A1* | 9/2014 | Elgarisi | H04L 12/4625 370/338 |
| 2015/0071204 | A1* | 3/2015 | Seok | H04B 7/0452 370/329 |
| 2015/0249529 | A1* | 9/2015 | Zheng | H04L 5/0055 370/336 |

OTHER PUBLICATIONS

Asterjadhi et al., "Short MAC Header Signaling," IEEE 802.11-12/01122r0 (Sep. 2012).

Cheong, "TGah Functional Requirements and Evaluation Methodology Rev. 5," IEEE P802.11 Wireless LANs, IEEE 802.11-11/0905r5 (Jan. 2012).

Chu et al., "Frame Header Compression," IEEE 802.11-12/0110r3 (Jan. 2012).

Chu et al., "Frame Header Compression," IEEE 802.11-12/0110r6 (Mar. 2012).

Chu et al., "Low Collision EDCA," IEEE 802.11-11/0116r0 (Jan. 2012).

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6GHz, IEEE P802.11ac/D2.0 (Jan. 2012).

Draft Standard for Information Technology—Telecommunications and information exchange between systems—Local and metropolitan area networks—Specific requirements Part 11: Wireless LAN Medium Access Control (MAC) and Physical Layer (PHY) Specifications, IEEE P802.11ai/D0.4 (Jan. 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

Kaiying et al., "MAC Header Design for Small Data Packet for 802.11ah," IEEE 802.11-12/0094r2 (Jan. 2012).

Leong et al., "A Short-Header Frame Format," IEEE 802.11-12/1106r0 (Sep. 2012).

Merlin et al., "MAC Header Compression," IEEE 802.11-12/0646r0 (May 2012).

Merlin et al., "Short MAC Header," IEEE 802.11-12/0857r0 (Jul. 2012).

Park et al., "TGah Spec Development Process," IEEE 802.11-12/0602r1 (May 2012).

Park et al., "TGah Spec Development Process," IEEE 802.11-12/0602r0 (May 2012).

Quan et al., "MAC Header Compression," IEEE 802.11-12/0365r1 (Mar. 2012).

Seok et al., "Duplicate Detection of Short MAC Frame," IEEE 802.11-13/0027r0 (Jan. 2013).

Simone Merlin (Qualcomm Inc.) et al., "MAC Header Compression," IEEE 802.11-12/0365r1, Mar. 2012, slides 1-9, URL, https://mentor.ieee.org/802.11/dcn/12/11-12-0365-01-00ah-mac-header-compression.pptx.

Simone Merlin (Qualcomm Inc.) et al., "MAC Header Compression," IEEE 802.11-12/0646r0, May 14, 2012, slides 1-14, URL, https://mentor.ieee.org/802.11/dcn/12/11-12-0646-00-00ah-compressed-mac-header.pptx.

* cited by examiner

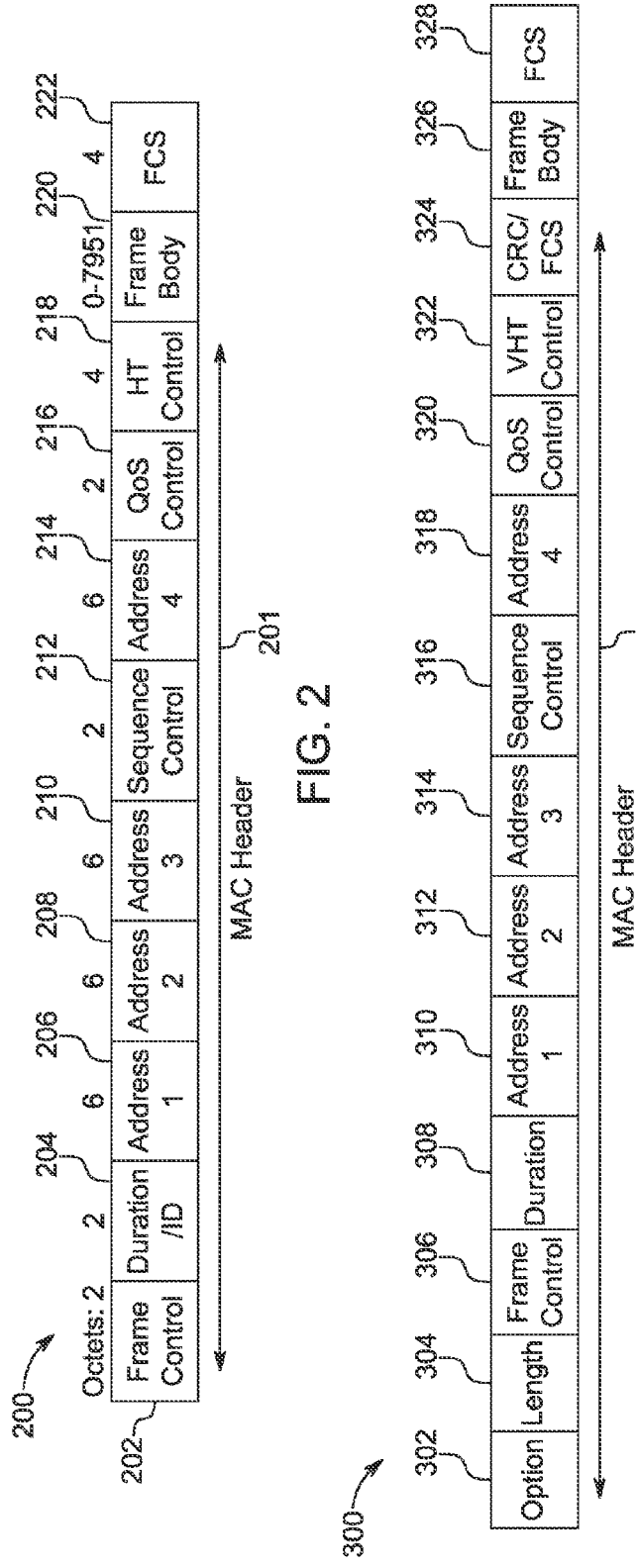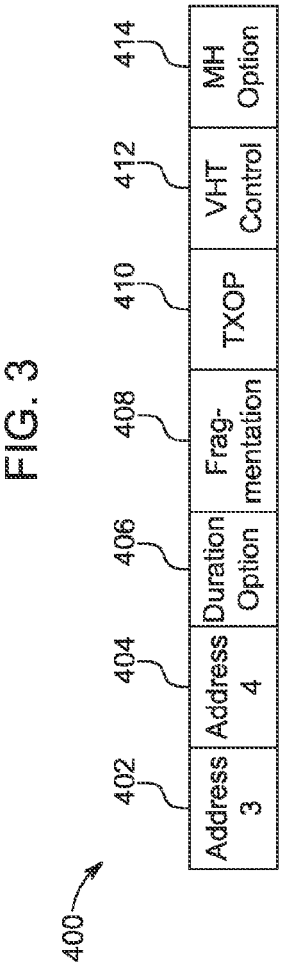

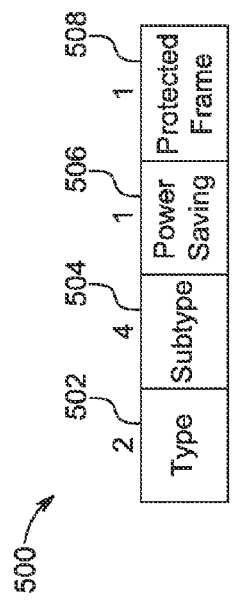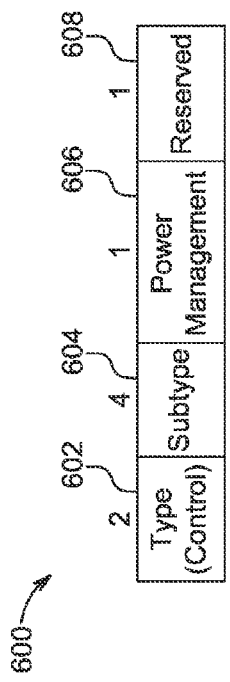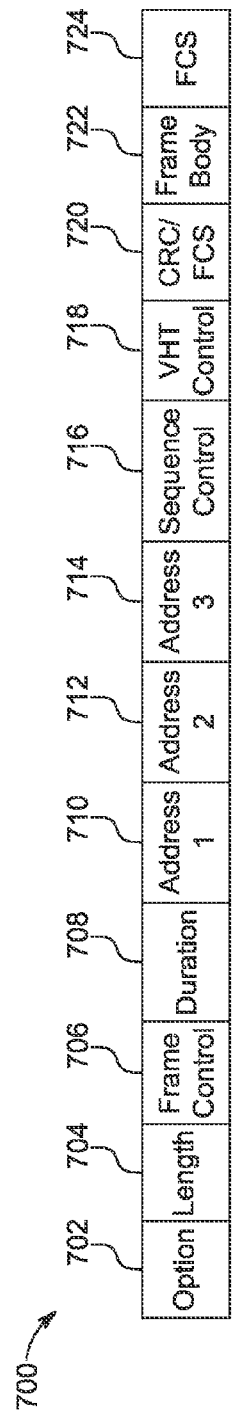

EFFICIENT MEDIUM ACCESS CONTROL (MAC) HEADER

CROSS REFERENCE TO RELATED APPLICATIONS

This application claims the benefit of U.S. Provisional Application No. 61/642,741, filed May 4, 2012, U.S. Provisional Application No. 61/668,598, filed Jul. 6, 2012, and U.S. Provisional Application No. 61/724,099, filed Nov. 8, 2012, the contents of which are hereby incorporated by reference herein.

The following are also incorporated by reference herein as if set forth in their entireties: IEEE 802.11-12/0602r0, "TGah Spec Development Process", Intel Et. Al, May 2012; IEEE 802.11-12/0365R1, "MAC HEADER COMPRESSION," QUALCOMM ET. AL., MARCH 2012; IEEE 802.11-12/0110R6, "FRAME HEADER COMPRESSION," STMICROELECTRONICS, MARCH 2012; IEEE 802.11-12/0094R2, "MAC HEADER DESIGN FOR SMALL DATA PACKET FOR 802.11AH," ZTE ET. AL., JANUARY 2012; IEEE 802.11-11/0905R5, "TGah Functional Requirements and Evaluation Methodology Rev 5", January 2012; IEEE Std 802.11™-2012: Wireless LAN MAC and PHY Specifications, March 2012; and IEEE P802.11ac™/D2.0: Wireless LAN MAC and PHY Specifications, January 2012.

BACKGROUND

New spectrum is being allocated for wireless communication systems such as wireless local area networks (WLANs). Such spectrum may be limited in size of a channel, bandwidth of a channel, fragmented, or uncombinable to provide very high throughput (VHT) services. Given the limitations of such spectrum, the WLAN systems may only be able to support smaller bandwidths and lower data rates compared to high throughput (HT)/VHT WLAN systems, for example, based on the 802.11n/802.11ac standards.

The IEEE 802.11ah Task Group (TG) has been established to develop solutions to support Wi-Fi systems in sub 1 GHz band. To accommodate the sometimes narrow bandwidths required by 802.11ah, the 802.11ac PHY may be down-clocked by a factor of 10. While support for 2, 4, 8, and 16 MHz can be achieved by the ⅒ down-clocking described above, support for the 1 MHz bandwidth requires a new PHY definition with a Fast Fourier Transform (FFT) size of 32.

For certain devices and traffic, in 802.11ah, 802.11, 802, or any other future device, it is desirable to reduce overhead to improve throughout. One source of overhead is the medium access control (MAC) header.

SUMMARY

A medium access control (MAC) frame having a short MAC header with at least two address fields and an indicator field that indicates it is a short MAC header is provided. The indicator field may indicate a presence of a third or fourth address field in the short MAC header. The indication may be a one, two, or any number of bits indicator.

BRIEF DESCRIPTION OF THE DRAWINGS

A more detailed understanding may be had from the following description, given by way of example in conjunction with the accompanying drawings wherein:

FIG. 2 shows a standard medium access control (MAC) header;

FIG. 3 shows an example MAC header;

FIG. 4 shows an example option field for an exemplary MAC header;

FIG. 5 shows an example frame control field for an exemplary MAC header;

FIG. 6 shows as example MAC header for control frames;

FIG. 7 shows an example MAC header for management frames;

DETAILED DESCRIPTION

Figure 1A:
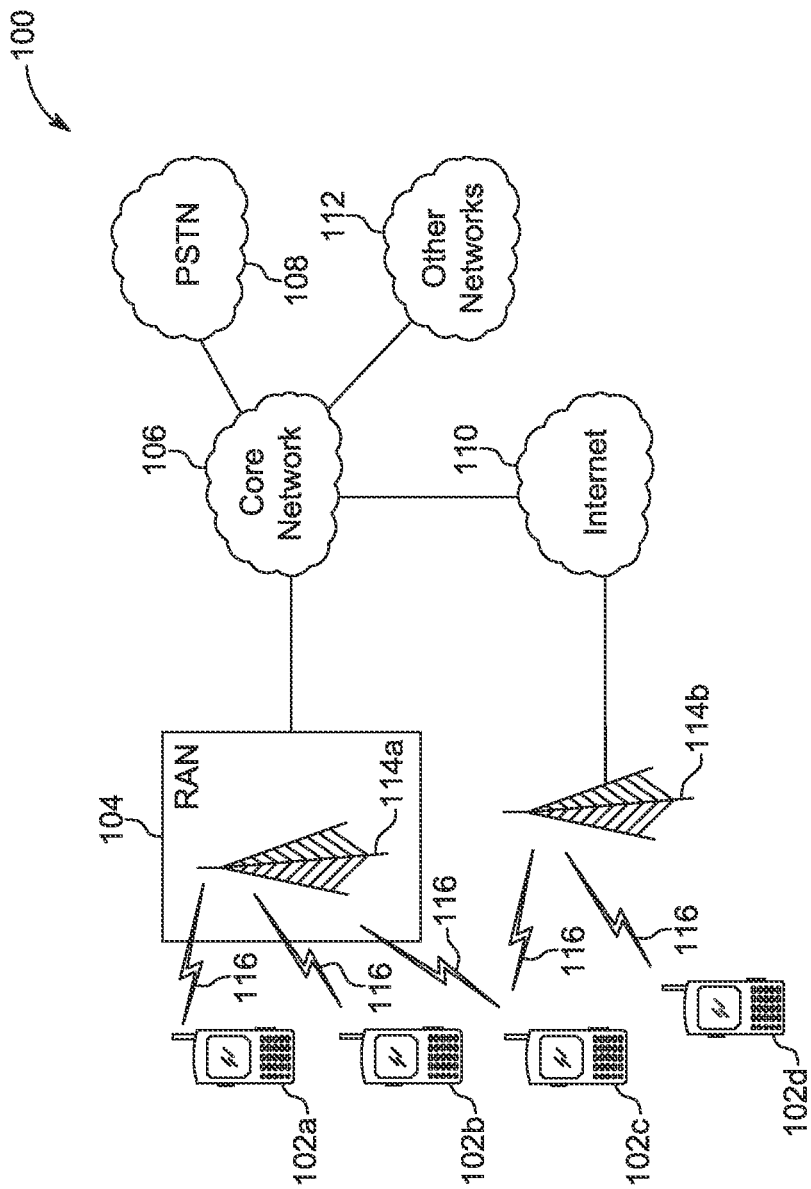
FIG. 1A shows an example communications system in which one or more disclosed embodiments may be implemented.

FIG. 1A is a diagram of an example communications system 100 in which one or more disclosed embodiments may be implemented. Communications system 100 may be a multiple access system that provides content, such as voice, data, video, messaging, broadcast, etc., to multiple wireless users. Communications system 100 may enable multiple wireless users to access such content through the sharing of system resources, including wireless bandwidth. For example, communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, communications system 100 may include wireless transmit/receive units (WTRUs) 102a, 102b, 102c, 102d, radio access network (RAN) 104, core network 106, public switched telephone network (PSTN) 108, Internet 110, and other networks 112, though it will be appreciated that the disclosed embodiments contemplate any number of WTRUs, base stations, networks, and/or network elements. Each of WTRUs 102a, 102b, 102c, 102d may be any type of device configured to operate and/or communicate in a wireless environment. By way of example, WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

Communications systems 100 may also include a base station 114a and a base station 114b. Each of base stations 114a, 114b may be any type of device configured to wirelessly interface with at least one of WTRUs 102a, 102b, 102c, 102d to facilitate access to one or more communication networks, such as core network 106, Internet 110, and/or other networks 112. By way of example, base stations 114a, 114b may be a base transceiver station (BTS), a Node-B, an eNode B, a Home Node B, a Home eNode B, a site controller, an access point (AP), a wireless router, and the like. While base stations 114a, 114b are each depicted as a single element, it will be appreciated that base stations 114a, 114b may include any number of interconnected base stations and/or network elements.

Base station 114a may be part of RAN 104, which may also include other base stations and/or network elements (not shown), such as a base station controller (BSC), a radio network controller (RNC), relay nodes, etc. Base station 114a and/or base station 114b may be configured to transmit and/or receive wireless signals within a particular geographic region, which may be referred to as a cell (not shown). The cell may further be divided into cell sectors. For example, the cell associated with base station 114a may be divided into three sectors. Thus, in one embodiment, base station 114a may include three transceivers, i.e., one for each sector of the cell. In another embodiment, base station 114a may employ multiple-input multiple-output (MIMO) technology and, therefore, may utilize multiple transceivers for each sector of the cell.

Base stations 114a, 114b may communicate with one or more of WTRUs 102a, 102b, 102c, 102d over an air interface 116, which may be any suitable wireless communication link (e.g., radio frequency (RF), microwave, infrared (IR), ultraviolet (UV), visible light, etc.). Air interface 116 may be established using any suitable radio access technology (RAT).

More specifically, as noted above, communications system 100 may be a multiple access system and may employ one or more channel access schemes, such as CDMA, TDMA, FDMA, OFDMA, SC-FDMA, and the like. For example, base station 114a in RAN 104 and WTRUs 102a, 102b, 102c may implement a radio technology such as Universal Mobile Telecommunications System (UMTS) Terrestrial Radio Access (UTRA), which may establish air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, base station 114a and WTRUs 102a, 102b, 102c may implement a radio technology such as Evolved UMTS Terrestrial Radio Access (E-UTRA), which may establish air interface 116 using Long Term Evolution (LTE) and/or LTE-Advanced (LTE-A).

In other embodiments, base station 114a and WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

Base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, base station 114b and WTRUs 102c, 102d may implement a radio technology such as IEEE 802.11 to establish a wireless local area network (WLAN). In another embodiment, base station 114b and WTRUs 102c, 102d may implement a radio technology such as IEEE 802.15 to establish a wireless personal area network (WPAN). In yet another embodiment, base station 114b and WTRUs 102c, 102d may utilize a cellular-based RAT (e.g., WCDMA, CDMA2000, GSM, LTE, LTE-A, etc.) to establish a picocell or femtocell. As shown in FIG. 1A, base station 114b may have a direct connection to Internet 110. Thus, base station 114b may not be required to access Internet 110 via core network 106.

RAN 104 may be in communication with core network 106, which may be any type of network configured to provide voice, data, applications, and/or voice over internet protocol (VoIP) services to one or more of WTRUs 102a, 102b, 102c, 102d. For example, core network 106 may provide call control, billing services, mobile location-based services, pre-paid calling, Internet connectivity, video distribution, etc., and/or perform high-level security functions, such as user authentication. Although not shown in FIG. 1A, it will be appreciated that RAN 104 and/or core network 106 may be in direct or indirect communication with other RANs that employ the same RAT as RAN 104 or a different RAT. For example, in addition to being connected to RAN 104, which may be utilizing an E-UTRA radio technology, core network 106 may also be in communication with another RAN (not shown) employing a GSM radio technology.

Core network 106 may also serve as a gateway for WTRUs 102a, 102b, 102c, 102d to access PSTN 108, Internet 110, and/or other networks 112. PSTN 108 may include circuit-switched telephone networks that provide plain old telephone service (POTS). Internet 110 may include a global system of interconnected computer networks and devices that use common communication protocols, such as transmission control protocol (TCP), user datagram protocol (UDP) and internet protocol (IP) in the TCP/IP internet protocol suite. Networks 112 may include wired or wireless communications networks owned and/or operated by other service providers. For example, networks 112 may include another core network connected to one or more RANs, which may employ the same RAT as RAN 104 or a different RAT.

Some or all of WTRUs 102a, 102b, 102c, 102d in communications system 100 may include multi-mode capabilities, i.e., WTRUs 102a, 102b, 102c, 102d may include multiple transceivers for communicating with different wireless networks over different wireless links. For example, WTRU 102c shown in FIG. 1A may be configured to communicate with base station 114a, which may employ a cellular-based radio technology, and with base station 114b, which may employ an IEEE 802 radio technology.

Figure 1B:
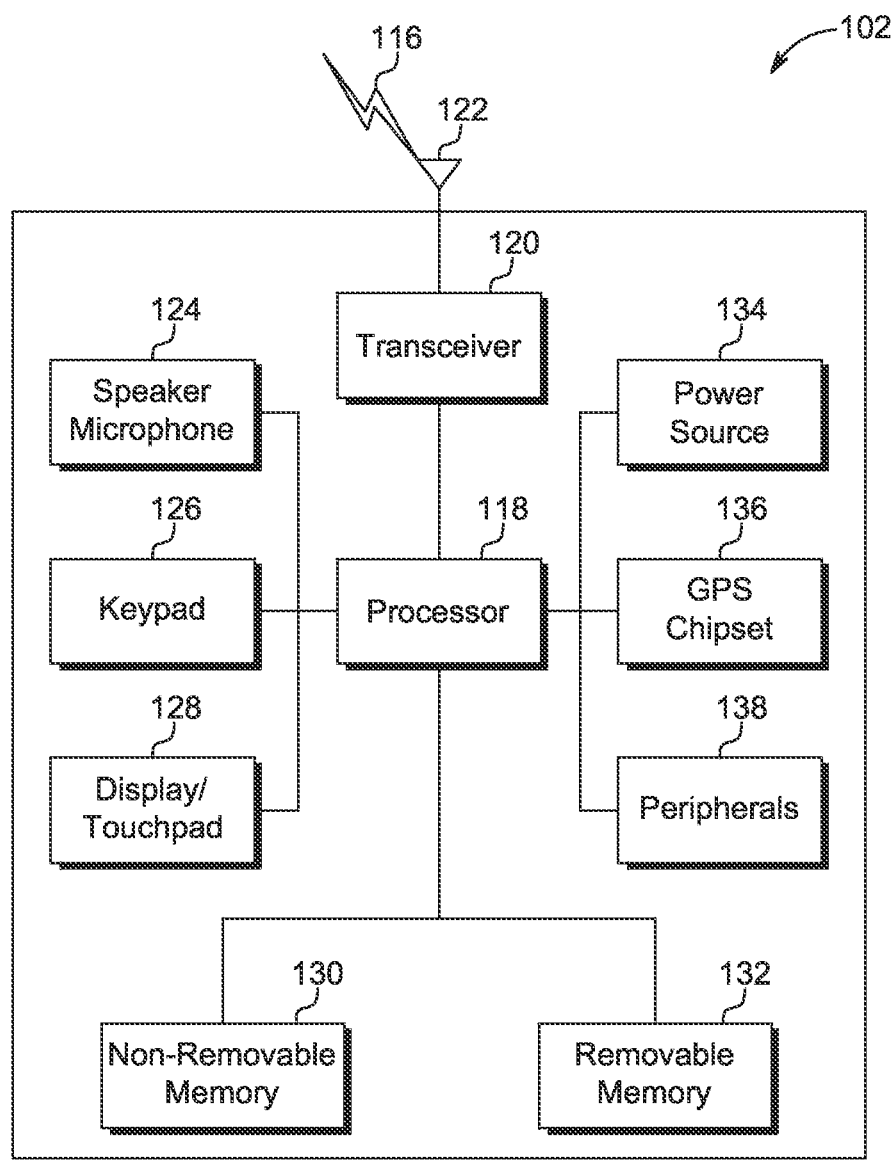
FIG. 1B shows an example wireless transmit/receive unit (WTRU) that may be used within the communications system shown in FIG. 1A.

FIG. 1B is a system diagram of an example WTRU 102. As shown in FIG. 1B, WTRU 102 may include processor 118, transceiver 120, transmit/receive element 122, speaker/microphone 124, keypad 126, display/touchpad 128, non-removable memory 130, removable memory 132, power source 134, global positioning system (GPS) chipset 136, and other peripherals 138. It will be appreciated that WTRU 102 may include any sub-combination of the foregoing elements while remaining consistent with an embodiment.

Processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. Processor 118 may perform signal coding, data processing, power control, input/output processing, and/or any other functionality that enables WTRU 102 to operate in a wireless environment. Processor 118 may be coupled to transceiver 120, which may be coupled to transmit/receive element 122. While FIG. 1B depicts processor 118 and transceiver 120 as separate components, it will be appreciated that processor 118 and transceiver 120 may be integrated together in an electronic package or chip.

Transmit/receive element 122 may be configured to transmit signals to, or receive signals from, a base station (e.g., base station 114a) over air interface 116. For example, in one embodiment, transmit/receive element 122 may be an antenna configured to transmit and/or receive RF signals. In another embodiment, transmit/receive element 122 may be an emitter/detector configured to transmit and/or receive IR, UV, or visible light signals, for example. In yet another embodiment, transmit/receive element 122 may be configured to transmit and receive both RF and light signals. It will be appreciated that transmit/receive element 122 may be configured to transmit and/or receive any combination of wireless signals.

In addition, although transmit/receive element 122 is depicted in FIG. 1B as a single element, WTRU 102 may include any number of transmit/receive elements 122. More specifically, WTRU 102 may employ MIMO technology. Thus, in one embodiment, WTRU 102 may include two or more transmit/receive elements 122 (e.g., multiple antennas) for transmitting and receiving wireless signals over air interface 116.

Transceiver 120 may be configured to modulate the signals that are to be transmitted by transmit/receive element 122 and to demodulate the signals that are received by transmit/receive element 122. As noted above, WTRU 102 may have multi-mode capabilities. Thus, transceiver 120 may include multiple transceivers for enabling WTRU 102 to communicate via multiple RATs, such as UTRA and IEEE 802.11, for example.

Processor 118 of WTRU 102 may be coupled to, and may receive user input data from, speaker/microphone 124, keypad 126, and/or display/touchpad 128 (e.g., a liquid crystal display (LCD) display unit or organic light-emitting diode (OLED) display unit). Processor 118 may also output user data to speaker/microphone 124, keypad 126, and/or display/touchpad 128. In addition, processor 118 may access information from, and store data in, any type of suitable memory, such as non-removable memory 130 and/or removable memory 132. Non-removable memory 130 may include random-access memory (RAM), read-only memory (ROM), a hard disk, or any other type of memory storage device. Removable memory 132 may include a subscriber identity module (SIM) card, a memory stick, a secure digital (SD) memory card, and the like. In other embodiments, processor 118 may access information from, and store data in, memory that is not physically located on WTRU 102, such as on a server or a home computer (not shown).

Processor 118 may receive power from power source 134, and may be configured to distribute and/or control the power to the other components in WTRU 102. Power source 134 may be any suitable device for powering WTRU 102. For example, power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

Processor 118 may also be coupled to GPS chipset 136, which may be configured to provide location information (e.g., longitude and latitude) regarding the current location of WTRU 102. In addition to, or in lieu of, the information from GPS chipset 136, WTRU 102 may receive location information over air interface 116 from a base station (e.g., base stations 114a, 114b) and/or determine its location based on the timing of the signals being received from two or more nearby base stations. It will be appreciated that WTRU 102 may acquire location information by way of any suitable location-determination method while remaining consistent with an embodiment.

Processor 118 may further be coupled to other peripherals 138, which may include one or more software and/or hardware modules that provide additional features, functionality and/or wired or wireless connectivity. For example, peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
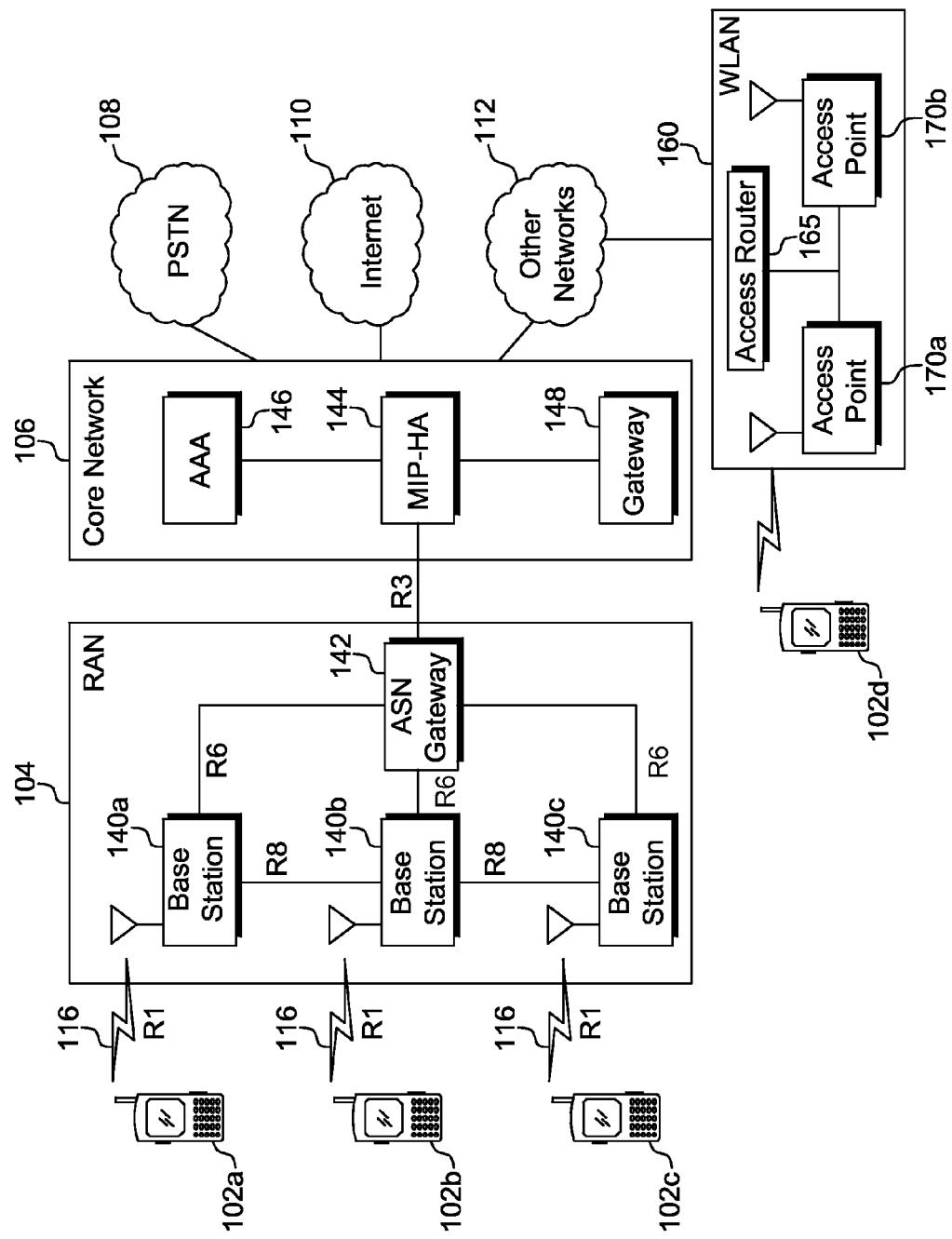
FIG. 1C shows an example radio access network and an example core network that may be used within the communications system shown in FIG. 1A.

FIG. 1C is a system diagram of RAN 104 and core network 106 according to an embodiment. RAN 104 may be an access service network (ASN) that employs IEEE 802.16 radio technology to communicate with WTRUs 102a, 102b, 102c over air interface 116. As will be further discussed below, the communication links between the different functional entities of WTRUs 102a, 102b, 102c, RAN 104, and core network 106 may be defined as reference points.

As shown in FIG. 1C, RAN 104 may include base stations 140a, 140b, 140c, and an ASN gateway 142, though it will be appreciated that RAN 104 may include any number of base stations and ASN gateways while remaining consistent with an embodiment. Base stations 140a, 140b, 140c may each be associated with a particular cell (not shown) in RAN 104 and may each include one or more transceivers for communicating with WTRUs 102a, 102b, 102c over air interface 116. In one embodiment, base stations 140a, 140b, 140c may implement MIMO technology. Thus, base station 140a, for example, may use multiple antennas to transmit wireless signals to, and receive wireless signals from, WTRU 102a. The base stations 140a, 140b, 140c may also provide mobility management functions, such as handoff triggering, tunnel establishment, radio resource management, traffic classification, quality of service (QoS) policy enforcement, and the like. ASN gateway 142 may serve as a traffic aggregation point and may be responsible for paging, caching of subscriber profiles, routing to core network 106, and the like.

Air interface 116 between WTRUs 102a, 102b, 102c and RAN 104 may be defined as an R1 reference point that implements the IEEE 802.16 specification. In addition, each of WTRUs 102a, 102b, 102c may establish a logical interface (not shown) with core network 106. The logical interface between WTRUs 102a, 102b, 102c and core network 106 may be defined as an R2 reference point, which may be used for authentication, authorization, IP host configuration management, and/or mobility management.

The communication link between each of base stations 140a, 140b, 140c may be defined as an R8 reference point that includes protocols for facilitating WTRU handovers and the transfer of data between base stations. The communication link between base stations 140a, 140b, 140c and ASN gateway 142 may be defined as an R6 reference point. The R6 reference point may include protocols for facilitating mobility management based on mobility events associated with each of WTRUs 102a, 102b, 102c.

As shown in FIG. 1C, RAN 104 may be connected to core network 106. The communication link between RAN 104 and core network 106 may defined as an R3 reference point that includes protocols for facilitating data transfer and mobility management capabilities, for example. Core network 106 may include mobile IP home agent (MIP-HA) 144, authentication, authorization, accounting (AAA) server 146, and gateway 148. While each of the foregoing elements are depicted as part of core network 106, it will be appreciated that any one of these elements may be owned and/or operated by an entity other than the core network operator.

MIP-HA 144 may be responsible for IP address management, and may enable WTRUs 102a, 102b, 102c to roam between different ASNs and/or different core networks. MIP-HA 144 may provide WTRUs 102a, 102b, 102c with access to packet-switched networks, such as Internet 110, to facilitate communications between WTRUs 102a, 102b, 102c and IP-enabled devices. AAA server 146 may be responsible for user authentication and for supporting user services. Gateway 148 may facilitate interworking with other networks. For example, gateway 148 may provide WTRUs 102a, 102b, 102c with access to circuit-switched networks, such as PSTN 108, to facilitate communications between WTRUs 102a, 102b, 102c and traditional land-line communications devices. In addition, gateway 148 may provide WTRUs 102a, 102b, 102c with access to networks 112, which may include other wired or wireless networks that are owned and/or operated by other service providers.

Although not shown in FIG. 1C, it will be appreciated that RAN 104 may be connected to other ASNs and core network 106 may be connected to other core networks. The communication link between RAN 104 and the other ASNs may be defined as an R4 reference point, which may include protocols for coordinating the mobility of WTRUs 102a, 102b, 102c between RAN 104 and the other ASNs. The communication link between core network 106 and the other core networks may be defined as an R5 reference, which may include protocols for facilitating interworking between home core networks and visited core networks.

Other network 112 may further be connected to an IEEE 802.11 based wireless local area network (WLAN) 160. WLAN 160 may include an access router 165. The access router may contain gateway functionality. Access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

A WLAN in infrastructure basic service set (BSS) mode may have an AP for the BSS and one or more stations (STAs) associated with the AP. The AP may have access or interface to a distribution system (DS) or another type of wired/wireless network that carries traffic in and out of the BSS. Traffic to STAs that originates from outside the BSS may arrive through the AP and is delivered to the STAs. Traffic originating from STAs to destinations outside the BSS may be sent to the AP to be delivered to the respective destinations. Traffic between STAs within the BSS may also be sent through the AP where the source STA sends traffic to the AP and the AP delivers the traffic to the destination STA. Such traffic between STAs within a BSS may be peer-to-peer traffic. Such peer-to-peer traffic may also be sent directly between the source and destination STAs with direct link setup (DLS) using an 802.11e DLS or an 802.11z tunneled DLS (TDLS). A WLAN in independent BSS (iBSS) mode has no AP, and STAs communicate directly with each other.

An example of an 802.11 medium access control (MAC) header 201 is shown in MAC frame 200 of FIG. 2. In the examples given herein, WTRU 102 may be configured as a STA to process, generate, receive, transmit or provide MAC frames or MAC headers. MAC frame 200 may comprise of a MAC header 201, variable-length frame body 220, or frame check sequence (FCS) 222. MAC header 201 may have a frame control field 202 and duration/ID field 204. MAC header 201 may also have address 1 field 206, address 2 field 208, address 3 field 210, and address 4 field 214 depending on the type of the frame and other characteristics. A sequence control information field 212, quality of service (QoS) control information field 216, and/or high throughput (HT) control field 218 may also be part of MAC header 201.

The frame control field 202 may have information for the current MAC frame such as type, subtype, whether the frame is a fragment, protected, ordered, or the like. The duration/ID field 204 may have information on medium time that the current MAC frame is reserving subsequently following the frame. In PS-Poll frames, duration/ID field 204 may be used to indicate the STA's association identifier (AID).

Moreover, sequence control information field 212 may have information on sequence numbers or fragmentation numbers of MAC frame 200. The QoS control information field 216 may have QoS related parameters. HT control field 218 may have at least two configurations. It may contain the HT version of the HT control information for an 802.11n STA or it may also contain the very HT (VHT) version of the HT control information for an 802.11ac STA, as desired.

Moreover, a variable-length frame body 220 of MAC frame 200 may contain information specific to the frame type or subtype. FCS 222 may contain an Institute of Electrical and Electronics Engineers (IEEE) 32-bit cyclic redundancy check (CRC) or similar error correction information, as desired. Due to backwards compatibility desirability, changes in MAC header 200 shown in FIG. 2 may be limited to additions of new fields as well as reinterpretation of existing bits and fields.

Overhead in MAC frame 200 may come from MAC header 201 which may be between 24 and 36 bytes depending on whether address 4 field 214, QoS control information field 216 and HT control field 218 are included. Overhead may also be protocol overhead for a data frame which includes a request to send (RTS) at 20 bytes, a clear to send (CTS) at 14 bytes, or acknowledgement (ACK) at 14 bytes. Overhead may also be channel access overhead which includes inter frame spacing (IFS) such as Short IFS/Distributed IFS/Point Coordination IFS SIFS/DIFS/PIFS and backoff time.

For a packet of small size, overhead may be undesirable. For example, an industrial process automation frame comprising of 64 bytes with a MAC header of 36 bytes results in undesirable overhead of 36%. MAC header compression may help to reduce MAC frame overhead. MAC header compression may be provided through two-way negotiation. MAC header compression may also be provided by reducing selected fields of a MAC header. Header compression may also be provided for a MAC header design for small data packets, as given in 802.11ah, by using an association identifier (AID) instead of MAC address for address 2 field 208.

For each data frame there is MAC level overhead contributed by a MAC header, protocol frames, and channel access time. For high data rate and large data packet size, the percentage of MAC overhead may be tolerable. However, as previously explained, small data packets or payloads may be the typical traffic in 802.11ah. For such small data packets, the MAC header, protocol frames, and channel access time may occupy unacceptably large percentage of air time and degrade the overall MAC efficiency or throughput for 802.11ah.

Described herein is an example MAC header that may reduce the overhead in 802.11ah, 802, or other packet transmissions. Since 802.11ah devices operate in sub 1 GHz spectrum where no other legacy devices operate, there may be no need for MAC header backwards compatibility. The MAC header may also be used for any wired or wireless communication system.

FIG. 3 shows an example of a MAC frame 300, such as an 802.11ah MAC frame. The fields contained in the MAC header 301 of MAC frame 300 may depend on information specified in option field 302. Individual specifications for a particular feature, for example, address 3 field 314 or address 4 field 318, or whether transmission opportunity (TXOP) Limit/Request is included may be determined by information in option field 302. Option field 302, or a subset of elements or multiple subsets of the elements of option field 302, may be implemented as a subfield or multiple subfields of existing fields such as frame control field 306, sequence control field 316. Option field 302 may also be a subfield or multiple subfields of entirely new fields in a MAC or physical layer convergence procedure (PLCP) header. Similarly, each field described below, or a subset of elements or multiple subsets of the elements thereof, may be implemented as a subfield or multiple subfields of existing or new fields in a MAC or PLCP header.

Fields contained in a MAC header 301 may also include a length field 304, frame control field 306, duration field 308, address 1-4 fields (or 310, 312, 314, and 318), sequence control field 316, QoS control field 320, a VHT control field 322 or CRC/FCS field 324. Option field 302 may indicate optional fields that are contained in a provided MAC header. Length field may be included in MAC frame to separately or in conjunction with option field 302 for a receiver to determine the length of the current MAC header.

Moreover, frame control field 306 may be a simplified frame control field. Duration field 308 may be an 8-bit field indicating a medium reservation. Address 1 field 310 and address 2 field 312 may be used to indicate the transmitter and receiver of the frame. Address 3 field 314 and address 4 field 318 may be included based on information indicated in option field 302. Sequence control field 316 may be a simplified sequence control field.

QoS control field 320 may contain information on QoS control. The length of QoS control field 320 may depend on features indicated by option field 302. VHT control field 322 may have VHT control specific information and its length depends on the features indicated by option field 302. CRC/FCS field 324 or FCS field 328 may be included in a MAC header for receivers to be able to check the integrity of the MAC header prior to decoding the remainder of the MAC frame body 326.

FIG. 4 shows an example option field 400. Option field 400 may indicate a particular version of a MAC header that may be in the current frame. Address 3 indication field 402 may use one or more bits to indicate whether Address 3 field 314 is included in a MAC header. Alternatively, the presence or absence of the Address 3 indication field 402 may also be indicated by other methods such as CRC masking, scrambler initiation seeds values, relative phase changes in signal (SIG) fields, or pilot values or patterns in the PLCP header.

Address 4 indication field 404 may use one or more bits to indicate whether address 4 field 318 is included in a MAC header. Alternatively, the presence or absence of address 4 field 318 may also be indicated by other methods such as CRC masking, scrambler initiation seeds values, relative phase changes in SIG fields, or pilot values or patterns in the PLCP header. The absence of address 4 field 318 may be implicitly indicated by the absence of address 3 field 314.

Duration option field 406 may be the option field of duration field 308. For example, the duration option field 406 may be at least two bits where a "00" may indicate that the time units used in duration field 308 is 10 microseconds, a "01" may indicate that the time units is 20 microseconds, a "10" may indicate that the time units is 30 microseconds, and a "11" may indicate that the time units is 40 microseconds. By using the different duration options, duration field 308 may be 8 bits and still be used to represent a large range of duration. This combination of duration options specifying time units and another subfield specifying the multiplier of the time units may be applied to other types of fields indicating durations of any type of time interval.

Fragmentation field 408 indicates whether the current frame contains fragmentation/fragmentations of a larger frame. It may, for example, determine or affect the STA behavior in interpreting the sequence control field 316. In addition, a fragmentation indication may affect the STAs' behavior in interpreting sequence control field 316. Fragmentation field 408 may use one or more bits to indicate whether the current frame contains fragmentation/fragmentations of a larger frame. Alternatively, the same information may also be indicated by other methods such as CRC masking, scrambler initiation seeds values, relative phase changes in SIG fields, or pilot values or patterns in a PLCP header.

TXOP field 410 may be a one bit field and may indicate whether the QoS control field 320 may be 1 byte or 2 bytes in length. If the TXOP field 410 has a value of 1, then QoS control field 320 may be 2 bytes long and the second byte may contain either TXOP limit, TXOP request or queue state. If the TXOP field 410 has a value of 0, and if the type and subtype indicate that a TXOP limit or TXOP request should be contained in QoS control field 320, the effect of receiving TXOP bit=0 may be similar to TXOP limit=0 or TXOP requested=0.

VHT control bit(s) 412 may be one or more bits used to indicate the options of VHT control field 322. For example, the VHT control bit(s) may be used to indicate that VHT control field 322 is not included in a MAC header, such as for low-capability STAs like sensors or meters. VHT control bit(s) 412 may also be used to indicate that there is no Modulation Coding Scheme (MCS) feedback (MFB) subfield included in VHT control field 322 and therefore may reduce the length of a MAC header by 2 bytes.

MAC Header (MH) option field 414 is a field that may indicate further reduction of a MAC header using negotiations for a few types of compressed or short MAC headers. MH option field 414 may be used to indicate the type of MAC header or MAC frames. For example, a pair of STAs may negotiate with each other and agree that they may use several types of MAC headers when communicating with each other, with different types of MAC headers associated with different traffic streams, QoS options, different levels of compressions, different values of fields or subfields in a MAC header and other fields in the MAC frame, or the like. MH option field 414 may also be indicated by other methods such as CRC masking, scrambler initiation seeds values, relative phase changes in SIG fields, or pilot values or patterns in the PLCP header.

Still referring to FIG. 4, option field 302 or 400 may be implemented as a sequence of bits with one or more bits indicating different fields that may be included in a MAC header, such as a bit map. Any subset of elements of option field 302 or 400 may be implemented as a subfield or multiple subfields of other existing fields such as the frame control field 306, sequence control field 316, or the like. Any subset of elements of option field 302 or 400 may also be a subfield or multiple subfields of entirely new fields in a MAC or PLCP header.

In addition, any subset of elements of the option field 302 or 400 may be implemented as a combination of subfields, multiple new subfields or other existing fields from a MAC and PLCP header. For example, one or more bits may be used in a PLCP header, (other methods such as CRC masking, scrambler initiation seed values, relative phase changes in SIG fields, or pilot values or patterns in the PLCP header may also be used), to indicate that a MAC header used is a short MAC header or a particular type of short MAC header.

In addition, one or more fields or subfields in a MAC header itself, such as frame control field 306 or sequence control field 316 or a newly defined field, may indicate the type of short frame header. For example, the type and subtype field in frame control field 306 may be used to indicate one or several types of short MAC header. In another example, one or more reserved bits in the frame control field 306 may be used to indicate one or more short MAC header types.

In another example, one type of short MAC header may be considered as default for a particular Wi-Fi/wireless standards or for a particular AP or BSS, (for example, such default short MAC frame may be included in a beacon, short beacon, probe response, association response frames or other types of management or control or other types of frames transmitted by the AP). One or more bits in a PLCP or MAC header such as in frame control field 306, sequence control field 316, or the like may be used to indicate that a short MAC header used is a different type of short MAC header than a default one. This may also be indicated by other methods such as CRC masking, scrambler initiation seeds values, relative phase changes in SIG fields, or pilot values or patterns or SIG, SIGA, SIGB bit(s) in the PLCP header.

Described herein is an STA behavior, operation, or configuration for MAC header 301. A transmitting STA may construct option field 302 or 400 in a MAC header of a packet depending on the information that it includes in MAC header 301. Alternatively, option field 302 or 400 or any subset of option field 302 or 400 may be constructed as a part of any existing or new field(s) in a MAC or PLCP header.

Described herein is the STA, such as by WTRU 102, behavior for handling MAC header 301. A transmitting STA may be configured to generate option field 302 or 400 in MAC header 301 of a packet depending on the information that it includes in MAC header 301. Receiving STAs may first decode, process, read, etc. option field 302 or 400. According to the information contained in option field 302 or 400, a receiving STA may decode the remainder of MAC header 301. For example, receiving STAs may decode address 3 field 314 if option field 302 or 400 indicates that an address 3 field is included in MAC header 301. A receiving STA subsequently interprets MAC header 301 according to the rules related to address fields detailed herein. Similarly, receiving STAs may decode address 4 field 318 if option field 302 or 400 indicates that an address 4 field 318 is included in MAC header 301. A receiving STA subsequently interprets MAC header 301 according to the rules related to address fields detailed herein.

In another example, an STA may determine using a PLCP header whether MAC header 301 that is associated with the packet that is currently being received is a short MAC header, and/or which type of short MAC header. If both the indication for the presence and type of the short MAC header are obtained through the PLCP header, the STA may interpret the MAC header according to the specified short MAC header definition. If there is an indication for the presence of the short MAC header in the PLCP header with no indication of the type of the short MAC header, the STA may interpret the MAC header itself to obtain information on which type of short MAC header is currently being received. Once the type of the short MAC header is determined, the fields of the short MAC header may be interpreted accordingly.

In another example, if a short MAC header is considered default, an STA may determine based on an indication in the PLCP or MAC header whether the current MAC header is another type of short MAC header. If the current MAC header is the default short MAC header, then the STA may interpret the MAC header accordingly. If another type of short MAC header other than the default type is detected, the STA may interpret the fields of the short MAC header according to the specified short MAC header type.

If length field 304 is included, it may indicate the length of MAC header 301. A transmitting STA may calculate the total length or the length of the remainder of MAC header 301 and sets the value of the length field 304 to such length. The receiving STA may decode the length field value and know how long the MAC header is and may decode the MAC header and the frame body field accordingly.

FIG. 5 shows an example frame control field 500. Frame control field 500 may be at least one byte. Frame control field 500 may have type field 502 and subtype field 504 that may be used to indicate the type and subtype of a MAC frame. Type field 502 and subtype field 504 may be interpreted in the same manner as is specified in the 802.11 standards. In addition to the type field 502 and subtype field 504, at least one bit may be used to indicate that the transmitting STA is entering a power saving state in field 506. At least another bit in frame control field 500 may be used to indicate that the MAC frame is a protected frame in field 508.

In another example, since all 802.11ah STAs may not have backwards compatibility challenges, frames may all be protected frames and the bit used to indicate that a MAC frame is a protected frame may instead be for "More Data." More data may indicate that the transmitting STAs have more buffered data for the receiving STAs.

Moreover, there are no "To DS" and "From DS" bits in frame control field 500, where DS is a distribution system. In an example, addressing schemes that utilize the "To DS" and "From DS" bits may be redesigned and are described herein when discussing an address field. However, since option field 400 may be implemented as a subfield(s) of any other MAC or PLCP header fields, "To DS" and "From DS" bits may be part of the frame control field 500 as well as a possible indication for addressing schemes.

Referring again to FIG. 3, duration field 308 may be used by transmitting STAs to indicate any medium reservation time that a current MAC packet is conducting starting at the end of the MAC packet. Duration field 308 may comprise of 1 byte and together with the duration option field 406, the 1-byte long duration field 308 may provide adequate range of any medium reservation durations.

A transmitting STA, such as WTRU 102, may determine the medium reservation time that it includes in MAC header 301 according to the rules described in the 802.11 Standards. Assuming that the medium reservation time determined is T, then the value in duration field 308 may be calculated as follows. Assuming that the agreed duration time units are, for example, TU1=10 microseconds, TU2=20 microseconds, TU3=30 microseconds, or TU4=40 microseconds, if at least two bits are used for the duration option field 406 in option field 400:

$$\begin{aligned}&\text{For } i = 1:4\\&\quad \text{if } T/TUi < 256\\&\quad\quad TDF = \text{ceiling } [T/TUi]\\&\quad\quad TU = TUi\\&\quad\quad \text{Break loop}\\&\quad \text{End}\\&\text{End}\end{aligned} \qquad \text{Equation (1)}$$

The value of duration field TDF and duration time unit TU is where the ceiling[A] function is the function that rounds any number A to the nearest integer that is greater than or equal to A. The value of duration field 308 may be set to TDF. The value of duration option field 406 in option field 302 or 400 may be set to a value associated with the timing unit TU. For example, if TU=30 microseconds, then the duration option value may be "10."

If a receiving STA receives a packet and decodes a non-zero value in duration field 308, it may then set its NAV counter to NAV=TDF×TU, where TU may be associated with the value contained in the duration option bits in option field 302 or 400.

In a power save (PS)-Poll frame, the duration field does not function as an indication of AID. The AP receiving the PS-Poll may simply evaluate the transmitter address (TA) field and search whether there are any packets buffered for the STA and respond accordingly. Duration field 308 may be eliminated or removed from PS-Poll frames.

In another example, sequence control field 316 may be reduced and may comprise of as few as 8 bits. The value of the sequence control field 316 indicates the sequence number of a MAC service data unit (MSDU), aggregated MSDU (A-MSDU) and MAC management protocol data unit (MMPDU). This field may also contain the fragmentation numbers if fragmentation is applied to MAC frame 300.

A transmitting STA, such as WTRU 102, may assign a sequence number to a MSDU, A-MSDU and MMPDU. The sequence number may be a modulo $2^8$ number. If a MSDU or MMPDU is fragmented by a transmitting STA, the transmitting STA may perform the following operations. The STA may set the a number of bits, for example, of the 4 LSB bits of the sequence control field 316 to the 4 LSB of the sequence number of the MSDU or MMPDU. The STA may set a number of bits, for example, 4 MSB of the sequence control field 316 to the complete or partial fragment number of the frame fragment. The STA may set the fragmentation bit in the option field 302 or 400 to "1" to indicate that the current frame is a fragment of a MSDU or MMPDU. The STA may use a special combination of the fragment number, e.g., "0000", to indicate that the current fragment is the last fragment of the fragmented MSDU or MMPDU.

If MAC frame body 326 contains a complete packet, not a fragmentation of a MSDU, MMPDU or other type of frame, transmitting STA, such as WTRU 102, may set the entire sequence control field 316 to the sequence number of the associated MSDU or MMPDU or other type of frames.

A receiving STA, such as WTRU 102, may be configured to do the following. The STA may evaluate whether at least one fragmentation bit has been set in the option field 302 or 400, or by other methods. If a fragmentation bit is set or is indicated otherwise, the receiving STA may interpret the sequence control field 316 as a combination of fragment number as well as a partial sequence number. If a fragmentation bit is not set or indicated otherwise, the receiving STA may interpret the sequence control field 316 as, for example, the modulo $2^8$ sequence number. The receiving STA may compare the sequence number or partial sequence number in case it is for a fragmented MSDU or MMPDU, as well as the TA field value, to records of packets received from the same transmitting STA to determine whether the current MAC frame is a duplicate. If a duplicate packet is detected, the frame may be ACK'd or block-ACK'd and then discarded.

As previously mentioned, MAC header 301 may contain up to 4 address fields. The number of address fields contained in MAC header 301 may be indicated by at least two bits in address 3 indication field 402 or address 4 indication field 404 in the option field 302 or 400. In MAC frames other than data frames, address 4 bit may be set to "0" indicating that there is no address 4 field 318. Similarly, the address 3 bit may be used to indicate whether address 3 field 314 is present. In data frames, address 3 and address 4 bits in option field 302 or 400 may be used in a similar fashion as the "To DS" and "From DS" bits in the frame control field 306. Address 3 field 314 and address 4 field 318 may be expressed as MAC addresses, association identifiers (AIDs), compressed SSID, or any other address types that the AP and the STAs may agree on.

Address 1 field 310 may contain the address of the receiving address, which may be an individual or a group address. If either address 1 field 310 or address 2 field 312 contain the address of the STA in the AP, which is also the BSSID, the individual/group bit in the BSSID may be used to indicate whether the current MAC frame is transmitted to or is from the DS.

In 802.11ac, an individual/group bit may be used in the transmitter address (TA) field to indicate "signaling TA", or that the scrambler initiation seeds are used for indicating bandwidth mode for MAC frames such as RTS. However, since 802.11ah STAs may not have backwards compatibility issues, the scrambler initiation seeds may always contain the bandwidth modes. For example, when the received MAC frame is of the subtype RTS, a receiving STA may check the scrambler initiation seeds to detect the correct operating modes the RTS is reserving the medium for communication.

Referring again to QoS, the presence of QoS control field 320 in a data frame may be indicated by the subtype field of the data frame. The TXOP bit in option field 302 or 400 may indicate the length of QoS control field 320. Four access categories (AC) may be used for 802.11x devices: AC-VO (voice), AC-VI (video), AC-BE (best-effort), and AC-BK (background). However it may be desirable to have additional access categories for 802.11ah devices, such as meters or sensors, that relate better to 802.11ah traffic.

Additional access categories (ACs) that may enhance the performance of sensor or meter STAs may be AC_VO for voice, AC_Vi for video, AC_BE for regular reporting (e.g., temperature, humidity measurement, etc.), AC_EP for elevated priority reporting (e.g., device running out of battery, sensor reading approaching pre-set threshold, etc.). Other ACs may be AC_EG for emergency (e.g., intruder, fire detection, etc.) and AC_RA for red alert (e.g. patient heart attack, dangerous gas release, etc.). These ACs may be encoded and indicated in the traffic identifier (TID) subfield in QoS control field 320.

QoS control field 320 may use 8 bits that are either reserved, or used to indicate TXOP request, TXOP limit, queue size, or AP PS buffer state. For a transmitting STA, if it transmits a QoS frame without using the 8 bits for TXOP limit, request, queue size, or AP PS buffer state, it may set at least one TXOP bit in the option field to "0" and/or include bits 0-7 in the QoS control field 320 and skip bits 8-15. The transmitting station, such as WTRU 102, may otherwise set TXOP bit(s) in the option field 302 or 400 to "1" and include bits 0-15 in QoS control field 320. A mesh STA includes bit 0-15 in the QoS control field 320 when transmitting QoS data frames.

For a receiving STA, if a TXOP bit(s) in option field 302 or 400 is 0, the receiving STA may interpret QoS control field 320 as a length of 8 bits without bits 7-15 specifying TXOP limit, request, AP PS buffer state, and queue size. A TXOP bit(s) in option field 302 or 400 is 1, the receiving STA may interpret QoS control field 320 as a length of 16 bits.

Since 802.11ah devices may not have backwards compatibility issues, they may include VHT control field 322 in their MAC header since the 802.11ah is a downclocked version of 802.11ac. VHT control field 322 may comprise of up to 4 bytes.

For a transmitting STA, if the transmitting STA has VHT capabilities it may include a full-size VHT control field 322 of 4-byte length and indicate such in option field 302 or 400. The STA may also include a partial sized VHT control field 322 of less than 4-byte length and indicate such in the option field 302 or 400. For example, the transmitting STA may indicate in the option field 302 or 400 that a VHT control field 322 of 2-byte length is included without bit 1 (currently reserved) and bits 9-23 (MFB subfield), effectively reducing 2 bytes from VHT control field 322.

For a receiving STA, such as WTRU 102, it may first evaluate the VHT control bit(s) in the option field 302 or 400 and interpret the VHT control field 322 of MAC header 301 according to the options specified.

MAC header 301 may contain error detection (ED) or error correction (EC) codes for the MAC header. The ED or EC code fields may be implemented as CRC or FCS. CRC/FCS field 324 may be used to independently verify whether MAC header 301 has been correctly received.

When a receiving STA receives MAC header 301 and while receiving the remainder of the MAC frame, the STA may decode the MAC header portion and verify the integrity of the received MAC header. If MAC header 301 has been correctly received, the STA may discover whether MAC frame 300 is destined for itself. If not, the STA may elect to set its NAV according to the values in duration field 308 and in the duration option 406 bits in option field 302 or 400. The STA may subsequently go to doze state for power saving and may wake up until the end of NAV. If MAC frame 300 is destined for the STA itself, the STA may stay awake and decode MAC frame 300.

FIG. 6 is an example MAC header for control frames 600. The frame control or frame type field 602 may comprise of 8 bits. Subtype field 604 may also be included. A transmitting STA may set the type in the MAC header for control frames 600 to control and may use at least one bit to indicate power management options in power management field 606. Moreover, a reserved field 608 may also be included.

A generic MAC header design for data frames may be similar to the generic design shown in FIG. 2. The transmitting STAs may select all the fields to be included in MAC header and indicate them in the option field 302 or 400 according to the descriptions above.

The transmitting STA, such as WTRU 102, may set the content of the address fields in the MAC header in a data frame according to Table 1. In data frames, the transmitting STA may set the two bits for address 3 and address 4 in option field 302 or 400 according to rules similar to those for setting the "To DS" and "From DS" bits previously defined in the frame control field 306.

TABLE 1

| Address 3 Bit | Address 4 Bit | Address 1 | Address 2 | MSDU | Address 3 A-MSDU | MSDU | Address 4 A-MSDU |
|---|---|---|---|---|---|---|---|
| 0 | 0 | RA = DA | TA = SA | BSSID | BSSID | N/A | N/A |
| 0 | 1 | RA = DA | TA = BSSID | SA | N/A | N/A | N/A |
| 1 | 0 | RA = BSSID | TA = SA | DA | N/A | N/A | N/A |
| 1 | 1 | RA | TA | DA | BSSID | SA | N/A |

In addition, when a transmitted frame is an A-MSDU, the transmitting STA may choose not to include address 3 field 314 in MAC header 301 when address 3 bit and address 4 bit have the value of "01" or "10." This may be as a result of the BSSID already being included in address 1 field 310 or address 2 field 312. The transmitting STA may choose not to include address 4 field 318 when address 3 bit and address 4 bit have the value of "11" since address 3 field 314 already contains the BSSID. An STA may set the Individual/Group Bit in the BSSID either in address 1 field 310 or address 2 field 312 to "1" to indicate that the data frame is meant for a specific BSS identified by the BSSID.

FIG. 7 shows an example MAC header for management frame 700. In management frame 700, fields 702-724 are similar to those described in FIG. 3. A transmitting STA may set address 1 field 710 to RA=DA and set address 2 field 712 to TA=SA. The STA may, in accordance with the rules specified in IEEE 802.11-2012 standards, set the address 3 field 714 to the BSSID, and if address 1 or address 2 fields are set to a BSSID which is not the wildcard BSSID, the transmitting STA may choose not to include Address 3 field 714, set the address 3 bit(s) in option field 702 to 0, or set the Individual/Group Bit in the BSSID either in address 1 or address 2 field to "1" to indicate that the management frame 700 is meant for a specific BSS identified by the BSSID.

Figure 8:
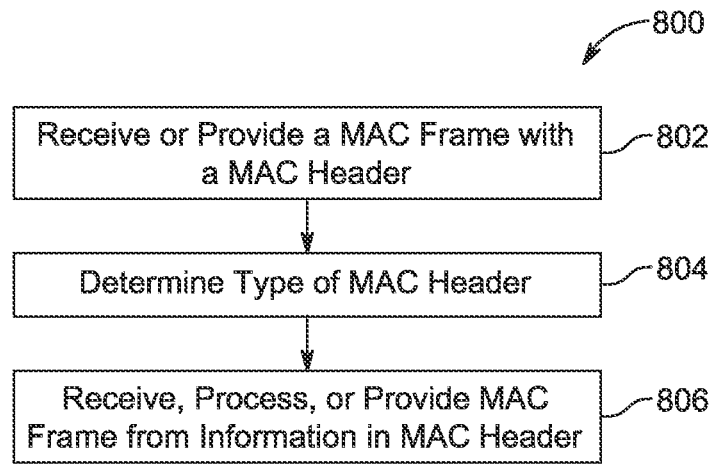
FIG. 8 shows an example of receiving or providing a MAC frame.

FIG. 8 shows an example 800 of receiving or providing a MAC frame with a MAC header. A MAC frame is received or provided by a WTRU (802). Providing may be processing, generating, encoding, assembling, or the like, such as by WTRU 102. Receiving may mean receiving, processing, decoding, disassembling, or the like, such as by WTRU 102. A WTRU may determine the MAC header type (804) and receive, process, or provide the MAC frame from information in the MAC header (806).

Described herein is a MAC header compression negotiation for an STA, such as WTRU 102, or an access point (AP). This example may reduce MAC level overhead and conduct MAC header compression through negotiations. There may be two options for MAC header compression: transmit information of the MAC header that is appropriate for the transmitting and receiving STAs' capability and relevant to the packets that are transmitted; or transmit portions of the MAC header that change from frame to frame and do not transmit the information that stays constant across frames. It may be possible to conduct one option at a time for MAC header compression or combine both options at the same time for MAC header compression. The content of the compressed MAC header may be negotiated by the AP and the STAs or may be purely AP-driven.

Described herein is AP announced MAC header Compression. AP announced MAC header compression may be more suitable for option 1 of MAC header compression, i.e., compressing the MAC header by transmitting portions of the MAC header that are appropriate for the transmitting and receiving STAs' capability and relevant to the packets that are transmitted. An AP may announce in its beacon, short beacon, or other management or control frames options for the contents of the MAC header. A BSS headed by an AP may support a specific application, such as a BSS that collects information from sensors like medical sensors or temperature sensors.

The options for the contents of the MAC header may be similar to option field 302 or 400 presented herein above. All STAs that want to associate with the AP may adapt the form of the MAC header that may be needed by the AP. The contents of the MAC header may vary from type to type, depending on the MAC frames, such as management frames, control frames, data frames, or the like.

Figure 9:
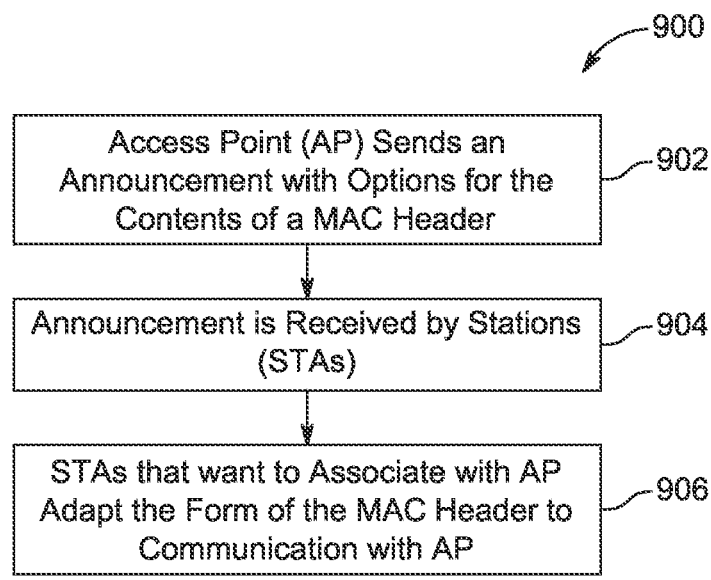
FIG. 9 shows an example of negotiating MAC header compression.

FIG. 9 shows an example 900 of negotiating MAC header compression. An AP sends an announcement with options for the contents of a MAC header (902), such as in an options field or a frame control field. An announcement is received by stations (STAs) (904). STAs that want to associate with the AP may adapt the form of their MAC headers to communication with the AP (906).

Described herein is STA-driven MAC header compression. The STA-driven MAC header compression may be more suitable for option 2 of MAC header compression, i.e., compressing the MAC header by transmitting portions of the MAC header that change from frame to frame and do not transmit the information that stays constant across frames. Here an STA may be an STA that resides inside an AP or a non-AP STA.

Each STA may be expected to transmit or receive at least several types of MAC frames from another STA or an AP. For each type of MAC frame, similar parameter settings may be negotiated and saved by the receiving STAs for MAC efficiency or MAC header compression. For example, if an STA transmits data frames of several different ACs to the AP, it may negotiate with the AP for those fixed parameters.

For example, the STA may have two traffic streams: one for AC_VI and the other for AC_VO. The STA may negotiate with the AP that it has two distinct types of QoS control field values. When transmitting traffic for AC_VO, the transmitting STA may indicate in the MAC header that the frame is of QoS_Type 1 and the AP, after receiving the packet, may look up the saved parameters of QoS_Type 2 that it has previously established with the transmitting STA. When the transmitting traffic is AC_VI, the transmitting STA may indicate in the MAC header that the frame is of QoS_Type 2 and the AP, after receiving the packet may look up the saved parameters of QoS_Type 2 that it has previously established with the transmitting STA.

Figure 10:
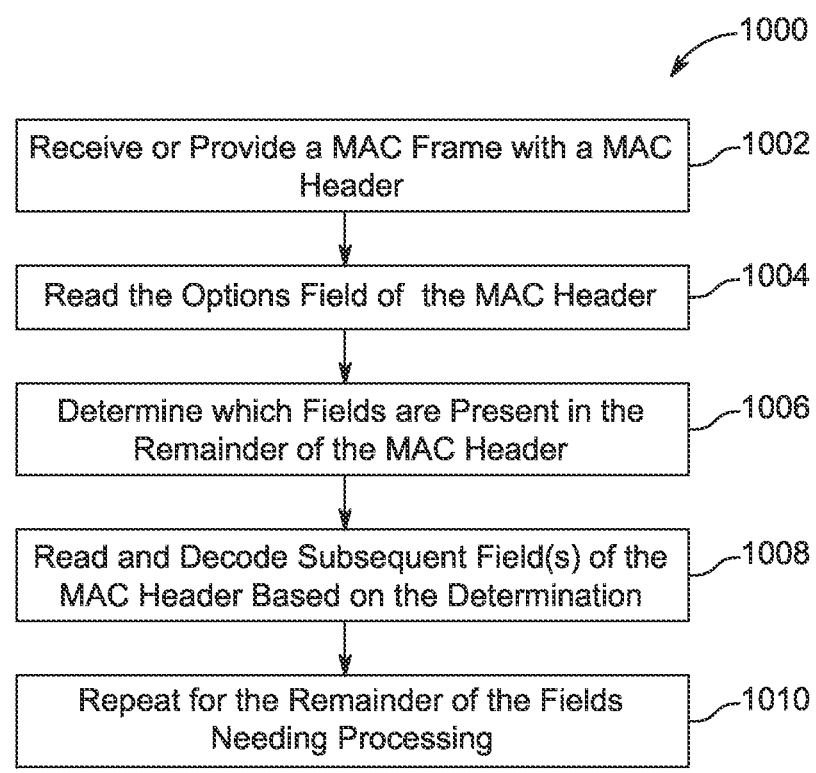
FIG. 10 shows an example of handling a MAC frame.

FIG. 10 shows an example 1000 of handling a MAC frame. A MAC frame with a MAC header is received or provided by a WTRU (1002). The options field or a frame control field, if any, of the MAC header is read, decoded, or processed (1004). The WTRU subsequently may determine which fields are present in the remainder of the MAC header (1006). Based on the determination, the WTRU reads and decodes subsequent field(s) of the MAC header (1008). The WTRU repeats the steps for the remainder of the fields that need processing (1010).

Although the solutions described herein consider 802 specific protocols, it is understood that the solutions described herein are not restricted to this scenario and are applicable to other wireless systems as well.

Although features and elements are described above in particular combinations, one of ordinary skill in the art will appreciate that each feature or element can be used alone or in any combination with or without the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) configured to operate in an IEEE 802.11 network, the WTRU comprising:
   a transceiver configured to receive a first medium access control (MAC) frame having a first MAC header;
   wherein the first MAC header includes two address fields, a MAC frame version indicator, and the first MAC header comprises a bit that indicates absence of a third address field in the first MAC header;
   the transceiver further configured to receive a second MAC frame having a second MAC header, wherein the second MAC header includes four address fields and wherein the second MAC header includes control information that indicates presence of a third address field and a fourth address field in the second MAC header; and
   a processor configured to determine a time interval for MAC frame transmissions by multiplying a duration value in a first message field by a multiplier value in a second message field.

2. The WTRU of claim 1, wherein the second MAC header further comprises an option subfield, wherein the option subfield comprises a fragmentation field, a transmission opportunity (TXOP) field, a very high throughput (VHT) control field, or a MAC Header (MH) option field.

3. The WTRU of claim 2, wherein the MH option field indicates different types of MAC headers.

4. The WTRU of claim 1, wherein the second MAC header further comprises at least two bits indicating time units used in a duration field in the second MAC header.

5. The WTRU of claim 1 further comprising:
   the processor configured to negotiate a MAC header type with another WTRU.

6. The WTRU of claim 1 further comprising:
   the processor configured to negotiate compression of the second MAC header with another WTRU.

7. The WTRU of claim 1, wherein the second MAC header further comprises a sequence control field.

8. The WTRU of claim 1, wherein the transceiver is further configured to transmit MAC frames during the time interval.

9. The WTRU of claim 1 further comprising:
the processor configured to negotiate at least two short MAC header types with another WTRU; and
wherein the at least two short MAC header types are selected based on a traffic stream characteristic or quality of service (QoS).

10. The WTRU of claim 1, wherein the first MAC header or the second MAC header includes a protected frame bit that indicates there is buffered data at the WTRU.

11. A method performed by a wireless transmit/receive unit (WTRU) operating in an IEEE 802.11 network, the method comprising:
receiving, by the WTRU, a first medium access control (MAC) frame having a first MAC header;
wherein the first MAC header includes two address fields, a MAC frame version indicator, and the first MAC header comprises a bit that indicates absence of a third address field in the first MAC header;
receiving, by the WTRU, a second MAC frame having a second MAC header, wherein the second MAC header includes four address fields and wherein the second MAC header includes control information that indicates presence of a third address field and a fourth address field in the second MAC header; and
determining, by the WTRU, a time interval for MAC frame transmissions by multiplying a duration value in a first message field by a multiplier value in a second message field.

12. The method of claim 11, wherein the second MAC header further comprises an option subfield, wherein the option subfield comprises a fragmentation field, a transmission opportunity (TXOP) field, a very high throughput (VHT) control field, or a MAC Header (MH) option field.

13. The method of claim 12, wherein the MH option field indicates different types of MAC headers.

14. The method of claim 11, wherein the second MAC header further comprises at least two bits indicating time units used in a duration field in the second MAC header.

15. The method of claim 11 further comprising:
negotiating, by the WTRU, a MAC header type with another WTRU.

16. The method of claim 11 further comprising:
negotiating, by the WTRU, compression of the second MAC header with another WTRU.

17. The method of claim 11, wherein the second MAC header further comprises a sequence control field.

18. The method of claim 11 further comprising:
transmitting, by the WTRU, MAC frames during the time interval.

19. The method of claim 11 further comprising:
negotiating, by the processor, at least two short MAC header types with another WTRU; and
wherein the at least two short MAC header types are selected based on a traffic stream characteristic or quality of service (QoS).

20. The method of claim 11, wherein the first MAC header or the second MAC header includes a protected frame bit that indicates there is buffered data at the WTRU.

\* \* \* \* \*